United States Patent
Légmán et al.

(10) Patent No.: US 6,286,620 B1
(45) Date of Patent: Sep. 11, 2001

(54) ACCESS PLATE FOR AN AXLE OF A DIFFERENTIALLY STEERED VEHICLE

(75) Inventors: László Légmán; Lóránt Tar; Andor Opitz; Tibor Végh, all of Magyar (HU)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/580,698

(22) Filed: May 30, 2000

(51) Int. Cl.$^7$ .................................................. B60K 17/16
(52) U.S. Cl. ...................... 180/374; 180/378; 180/9.44; 180/6.66
(58) Field of Search .................................... 180/374, 378, 180/337, 375, 377, 9.1, 9.44, 6.44, 6.64, 6.66; 477/1; 475/18, 28

(56) References Cited

U.S. PATENT DOCUMENTS

| | | | |
|---|---|---|---|
| 3,530,741 | 9/1970 | Charest | 74/675 |
| 4,506,772 | 3/1985 | Sommer | 192/18 |
| 4,611,505 | 9/1986 | Cronin et al. | 74/720 |
| 4,718,508 | 1/1988 | Tervola | 180/6.44 |
| 4,882,947 | * 11/1989 | Barnard | 74/687 |
| 5,004,060 | 4/1991 | Barbagli et al. | 180/6.44 |
| 5,390,751 | * 2/1995 | Puetz et al. | 180/6.48 |
| 5,423,235 | * 6/1995 | Botterill et al. | 74/665 GA |
| 5,558,174 | * 9/1996 | Avitan et al. | 180/60 |
| 5,871,413 | 2/1999 | Tar et al. | 475/23 |
| 5,873,800 | * 2/1999 | Maslow et al. | 476/38 |
| 5,921,335 | 7/1999 | Straeker | 180/6.44 |

* cited by examiner

*Primary Examiner*—Paul N. Dickson
*Assistant Examiner*—Avraham H. Lerner

(57) ABSTRACT

A differentially steered work vehicle is provided with a driving axle having a axle housing with an access opening. An access plate is secured to the access opening and is provided with steering components. The access plate is provided with a steering motor mount that passes through the access plate. A steering motor is mounted to the steering motor mount on the exterior side of the access plate. The interior side of the access plate is provided with a rotatable steering shaft having a first toothed end and a second toothed end. The first toothed end drives a first spur gear which is operatively coupled to the ring gear of a first planetary set. The second toothed end of the steering shaft is operatively coupled to a reverser gear that is also rotatably mounted to the interior side of the access plate. The reverser gear is mounted on a pin mounted to the interior side of the access plate. The reverser gear is operatively coupled to a second spur gear that in turn is operatively coupled to a second ring gear of a second planetary set. The sun gear of each planetary set is driven by a main drive input. The planetary carriers of each planetary set drive the final drives of the drive wheels.

14 Claims, 6 Drawing Sheets

ACCESS PLATE FOR AN AXLE OF A DIFFERENTIALLY STEERED VEHICLE

BACKGROUND OF THE INVENTION

1. Field of the Invention

The invention is directed to a differentially steered axle having an access plate to which the steering motor and some of the steering components are mounted.

2. Description of the Prior Art

Differentially steered work vehicles are well known. Differential steering uses changes in wheel speed on the left and right sides of the vehicle to steer. This steering system can be used on tracked and wheeled vehicles. One system that has been used in the prior art is a planetary system having two planetary gear sets. The main drive input from the vehicle transmission drives the sun gear of both planetary gear sets and a steering motor is used to drive the ring gears of both planetary sets. The final drives driving the wheel hubs are coupled to the planetary carriers. Whenever the steering motor increases the speed in one planetary set, the same amount of speed is subtracted from the other planetary set. For example if the speed on one side is increased by three miles per hour, the speed on the other side is decreased three miles per hour. At very slow speeds or when the vehicle is stopped the vehicle can be spin steered. That is the vehicle can be turned on its vertical axis. Typically the steering motor is coupled to the ring gears of the planetary sets by a beveled pinion gear that meshes with the beveled ring gear. An example of this steering system is disclosed in U.S. Pat. No. 4,718,508.

Spur gears have also been used to provide the steering input to the planetary gear sets. If spur gears are used a reverser mechanism is required to provide a rotational change in direction between the planetary sets by the steering motor input. In one example, the main drive input from the vehicle transmission is directed to the planetary carriers of both planetary sets and the steering input is directed to the sun gear of both planetary sets. The steering input is applied to a steering shaft that is parallel to the drive axle. One end of the steering shaft drives a first spur gear which is operatively coupled to the first planetary set. The other end of the steering shaft drives a reverser gear that in turn drives a second spur gear which is operatively coupled to the second planetary gear. The final drives for the wheel hubs are coupled to the ring gear, see U.S. Pat. No. 5,921,335.

SUMMARY

It is an object of the present invention to provide a differentially steered drive axle having an access plate that provides easy access to the steering mechanism in the axle.

The axle is provided with an axle housing that is secured to the work vehicle. A steering mechanism for differentially steering the work vehicle is located inside the axle housing. A main drive rotational input from the transmission of the work vehicle is directed into the axle housing for driving the final drive units of the vehicle. The final drive units in turn drive the wheel hubs of the vehicle. The steering mechanism comprises first and second planetary gear sets which receive the main rotational input from the main drive input and directs this input to the first and second final drives. An access plate for covering an access opening in the axle housing is provided with an exterior side and an interior side. A steering motor mount is provided in the access plate for receiving a steering motor and directing its steering input to a steering shaft rotatively mounted to the interior side of the access plate. The steering motor is mounted on the exterior side of the access plate. A first spur gear is also rotatively mounted to the interior side of the access plate and drivingly engages the rotatable shaft. In addition, the first spur gear operatively engages the first planetary gear set. A reverser gear is rotatively mounted on a pin mounted to the interior side of the access plate and drivingly engages the rotatable shaft. In addition, the reverser gear operatively engages a second spur gear. The second spur gear is also rotatively mounted to the interior side of the access plate and operatively engages the second planetary gear set.

The steering motor is a hydraulic motor that can be driven in a clockwise or counterclockwise direction. When the steering motor is driven in a clockwise direction, it rotates the steering shaft in a counterclockwise direction. The steering shaft applies this counterclockwise input to the first spur gear and the reverser gear driving them both in a clockwise direction. This clockwise input is applied to the first planetary gear set by the first spur gear driving the first ring gear of the first planetary gear set in a counterclockwise direction. Similarly, the reverser gear is driven in a clockwise direction by the steering shaft and thereby drives the second spur gear in a counterclockwise direction. The second spur gear, in turn drives the second ring gear of the second planetary set in a clockwise direction. In this way the vehicle is differentially steered by adding speed to one side of the vehicle and subtracting the same amount of speed from the other side of the vehicle.

DETAILED DESCRIPTION

Figure 1:
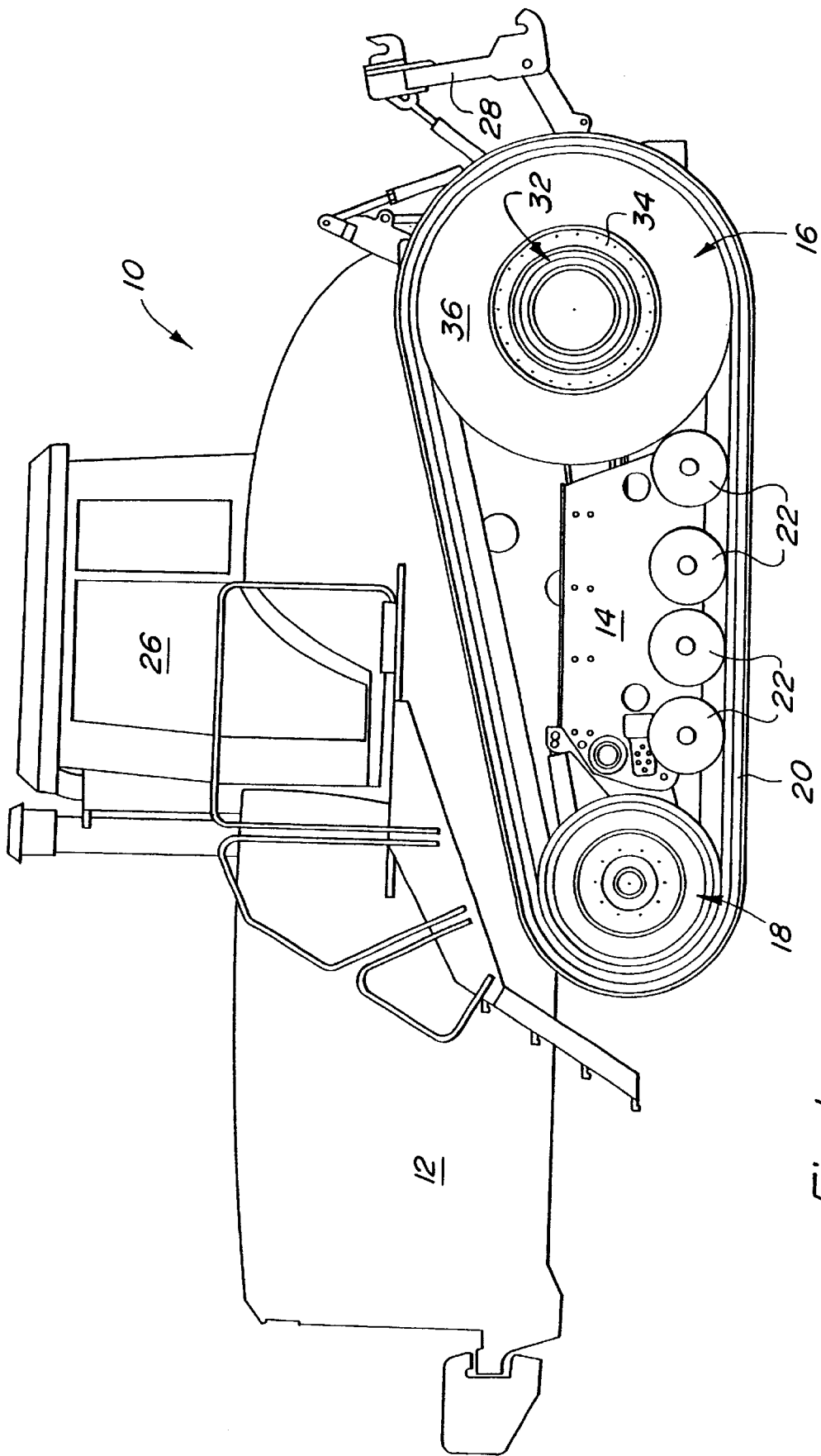
FIG. 1 is a side view of a differentially steered work vehicle having tracks.
Figure 2:
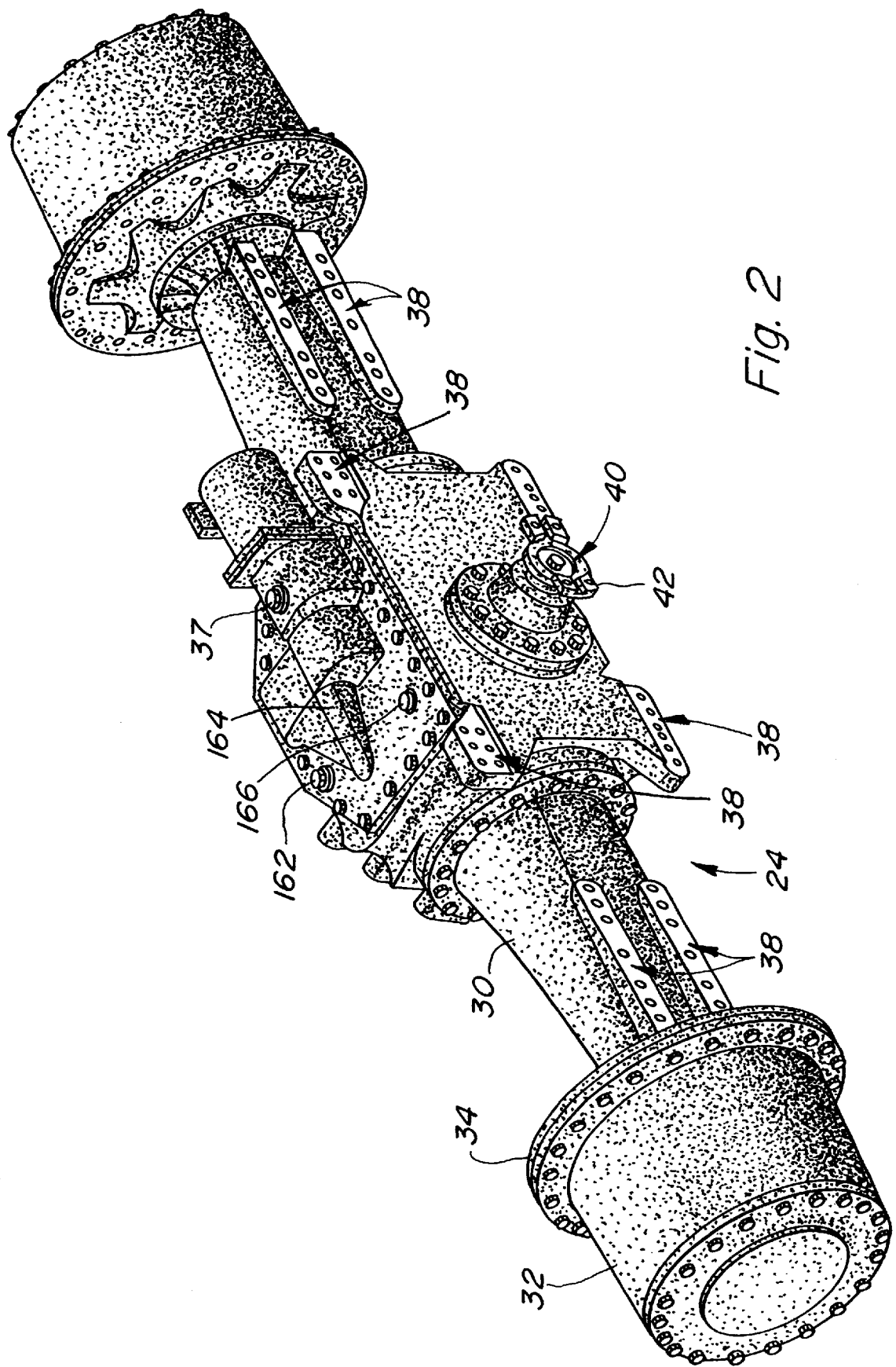
FIG. 2 is a front top perspective view of the rear drive axle of the work vehicle of FIG. 1.

FIG. 1 illustrates a large track vehicle 10 having a main frame 12 and a track frame 14. The vehicle is provided with a pair of drive wheels 16 and a pair of idler wheels 18. A track 20 comprising an inextensible elastomeric belt is entrained about the drive wheels 16 and the idler wheels 18. The exterior of the belt is provided with ground engaging cleats and the interior of the belt is provided with centering guide lugs. The track frame is also provided with midwheels 22 for better distributing the load of the vehicle on the ground. The track frame maybe provided with a equalizer bar to distribute load between the left and right segments of the track frame. The drive wheels 16 are mounted to an axle 24 which receives a main drive input from a transmission driven by an internal combustion engine, not shown, that are mounted to the main frame 12. The operation of the vehicle is controlled from operator's cab 26. By rotating the steering wheel located in the operator's cab, the tracks are differentially steered. The track vehicle 10 is also provided with an implement hitch 28. Although the illustrated work vehicle is a rubber tracked work vehicle, this invention can also be applied to conventional steel tracked vehicles and differentially steered wheeled vehicles.

Figure 3:
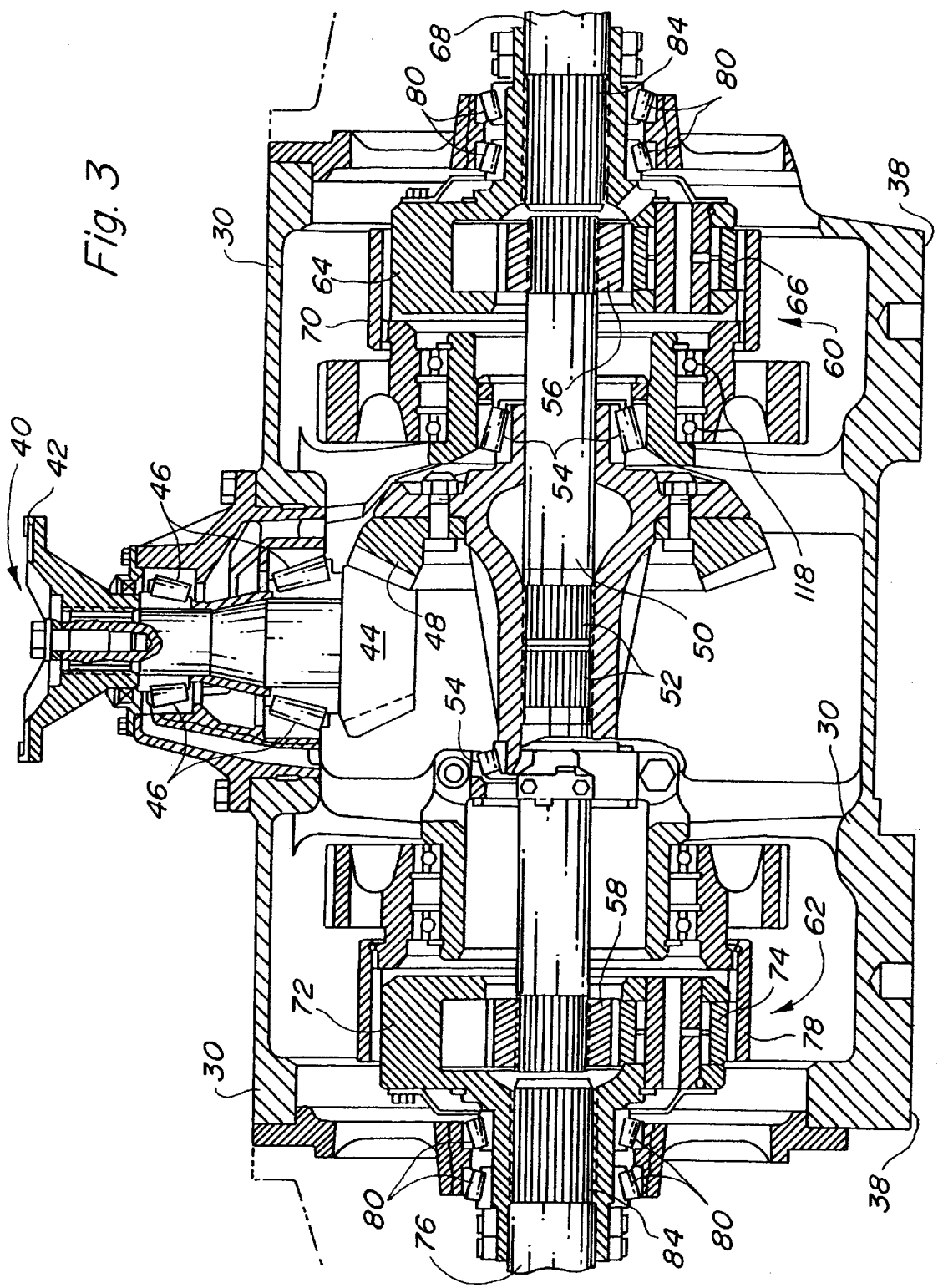
FIG. 3 is a top cross sectional view of the drive axle specifically a portion of the steering mechanism.

The axle 24 comprises an elongated axle housing 30 which terminates in final drives 32. The final drives 32 define a wheel hub having a circumferential flange 34 that is bolted to wheel flanges 36 of drive wheels 16. The axle housing 30 is bolted to main frame 12 at mounting flanges 38. The inner workings of the axle housing are operatively coupled to the vehicle transmission and engine by a main drive input 40. The main drive input 40 comprises a drive shaft that extends through the axle housing 30. The main drive input 40 has a first end 42 that is coupled to the transmission, and a second end that is provided with a beveled pinion gear 44. As is best illustrated in FIG. 3, the main drive input 40 is rotatively mounted to the axle housing 30 by bearings 46. The bevel pinion gear 44 operatively engages bevel gear 48 that is fixed to drive shaft 50 by splines 52. Drive shaft 50 is rotatively mounted in axle housing 30 by bearings 54. This drive shaft 50 is provided with a first end having a first sun gear 56 and a second end having a second sun gear 58. These sun gears 56 and 58 are operatively coupled to a first and second planetary gear sets 60 and 62, respectively.

The first planetary gear set 60 is provided with a first planetary carrier 64 which is driven by a first set of planet gears 66 that operatively engage the first sun gear 56. The first planetary carrier 64 in turn is coupled to a first final drive shaft 68 that drives the right final drive 32. The first set of planet gears 66 rotate inside a first ring gear 70. Similarly, the second planetary gear set 62 is provided with a second planetary carrier 72 which is driven by a second set of planet gears 74 that operatively engage the second sun gear 58. The second planetary carrier 72 in turn is coupled to the second final drive shaft 76 for driving the left final drive 32. The second set of planet gears 74 rotate inside second ring gear 78. In straight ahead and straight reverse operations, the first and second ring gears 70 and 78 are not rotated and the same speed is applied to both the first and second final drive shafts 68 and 76. The first and second planetary carriers 64 and 72 are rotatively supported by the axle housing 30 in bearings 80. The first and second planetary carriers 64 and 72 are coupled to the first and second final drive shafts 68 and 76 by splines 84.

Figure 4:
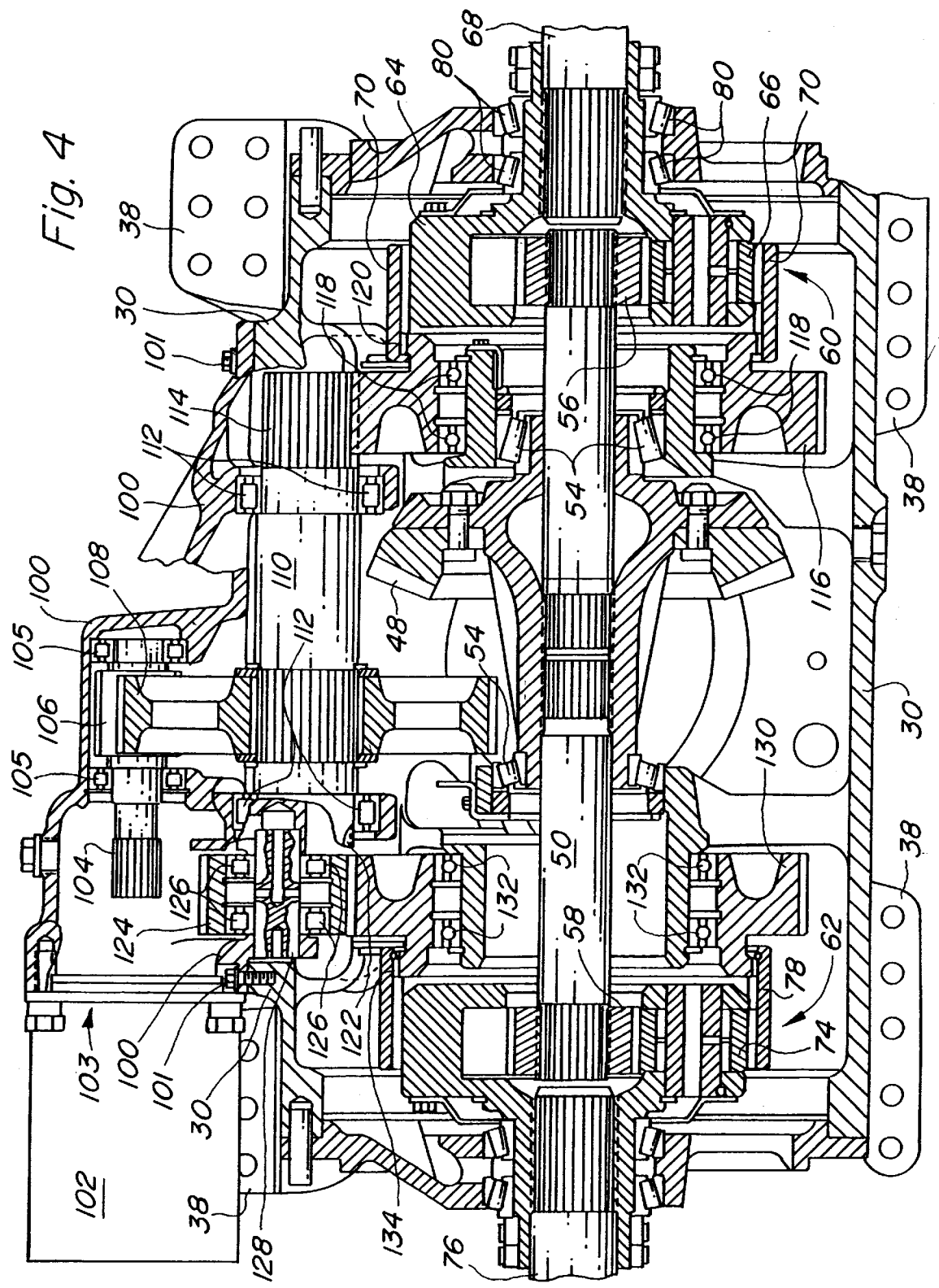
FIG. 4 is a rear cross sectional view of the drive axle illustrating the portion of the steering mechanism mounted to the interior side of the access plate.
Figure 5:
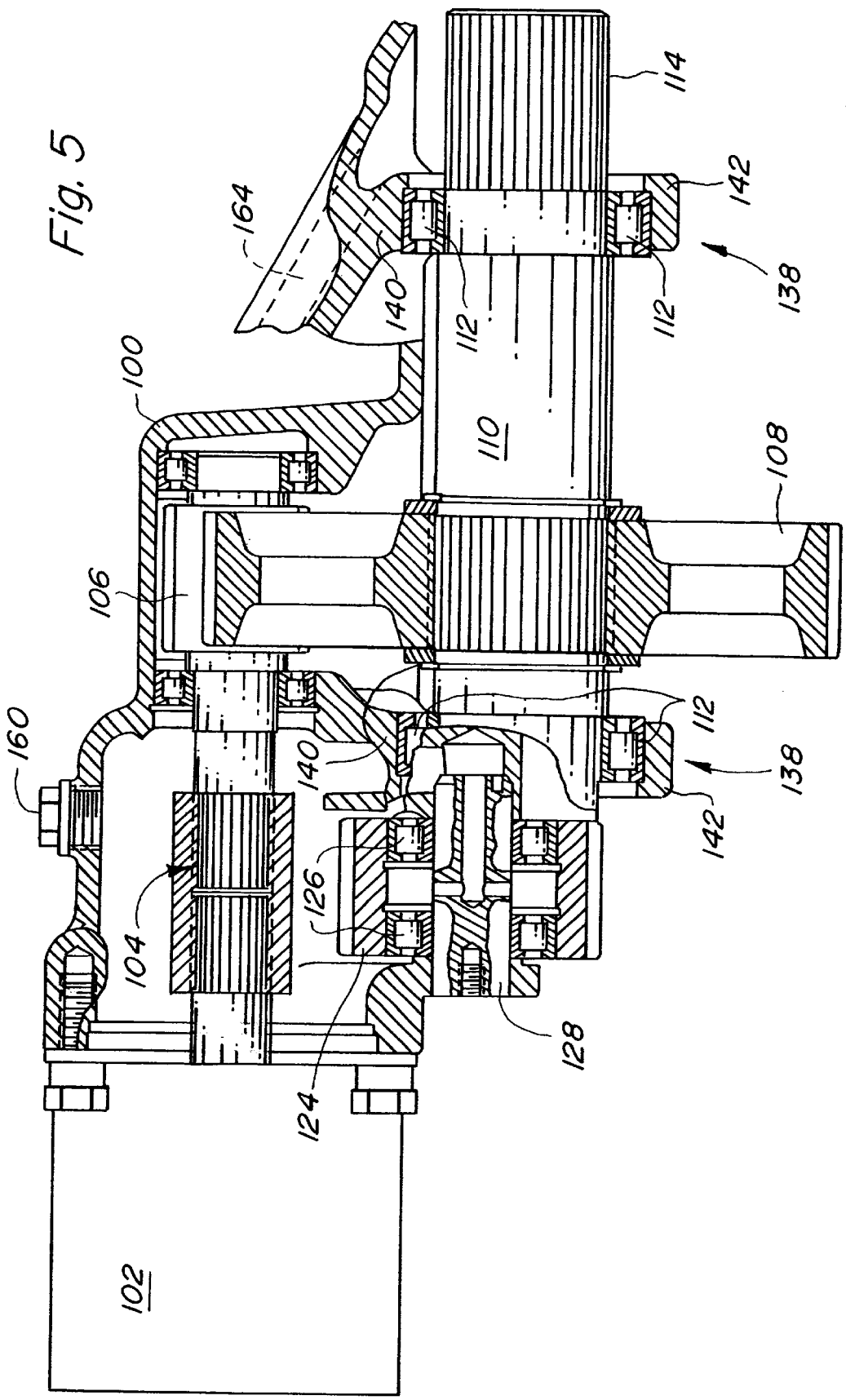
FIG. 5 is a rear cross sectional view of the access plate removed from the axle housing.

Turning now to FIG. 4, this figure is a rear cross sectional view of the axle illustrating an access plate 100 that is bolted to the axle housing 30 by bolts 101. The access plate 100 is locate On the top of the axle housing 30 and has a portion of the steering mechanism attached to its interior side. The steering control for the steering mechanism comes from a steering motor 102 that is bolted to a steering motor mount 103 that extends through the access plate 100. The steering motor 102 is mounted on the exterior side of the access plate 100. The steering motor 102 would most typically be a hydraulic motor controlled by the steering wheel in the operator's cab 26. However the motor could also be an electrical motor or a pneumatic motor. The motor mount 103 is provided with a motor mount drive shaft 104 to which is mounted a third spur pinion gear 106. The motor mount drive shaft 104 is coupled to the output shaft of the steering motor 102 and is rotatably supported on the interior side of the access plate 30 by bearings 105. The third spur pinion gear 106 and drives a fourth spur gear 108. The fourth spur gear 108 is fixed to steering shaft 110 that is rotatively mounted to the access plate by bearings 112. The steering shaft has a first toothed end 114 that drives a first spur gear 116. The first spur gear is rotatively mounted to axle housing 30 by bearings 118. The first spur gear 116 in turn is operatively coupled to first ring gear 70 by toothed connection 120.

The other end of the steering shaft 110 is provided with a second toothed end 122 that drives a reverser gear 124. The second toothed end 122 has a smaller diameter than the first toothed end 114 so it does not engage the second spur gear 130 which has the same diameter as the first spur gear 116. The reverser gear 124 is rotatively mounted to the access plate 100 by bearings 126. The bearings 126 are mounted to a pin 128 that is mounted to the access plate 100. The reverser gear 124 in turn is driven by the second toothed end 122 and is also operatively coupled to a second spur gear 130. The second spur gear 130 is rotatively mounted to the axle housing 30 by bearings 132. The second spur gear 130 is operatively coupled to the second ring gear 78 by toothed connection 134. Therefore whenever the steering motor 102 drives the steering shaft 110 in a clockwise direction, the steering shaft 110 drives the first spur gear 116 and the reverser gear 124 in a counterclockwise direction. The reverser gear, in turn, drives the second spur gear 130 in a clockwise direction while the first spur gear 116 is driven in a counterclockwise direction directly by the steering shaft 110. As such, the planetary ring gears 70 and 78 are driven in opposite directions. This reduces the speed on one side of the vehicle while increasing the speed on the other side of the vehicle by a like amount. The rings gears 70 and 78 are mounted to their respective spur gears 116 and 130 by the toothed connections 120 and 134.

Figure 6:
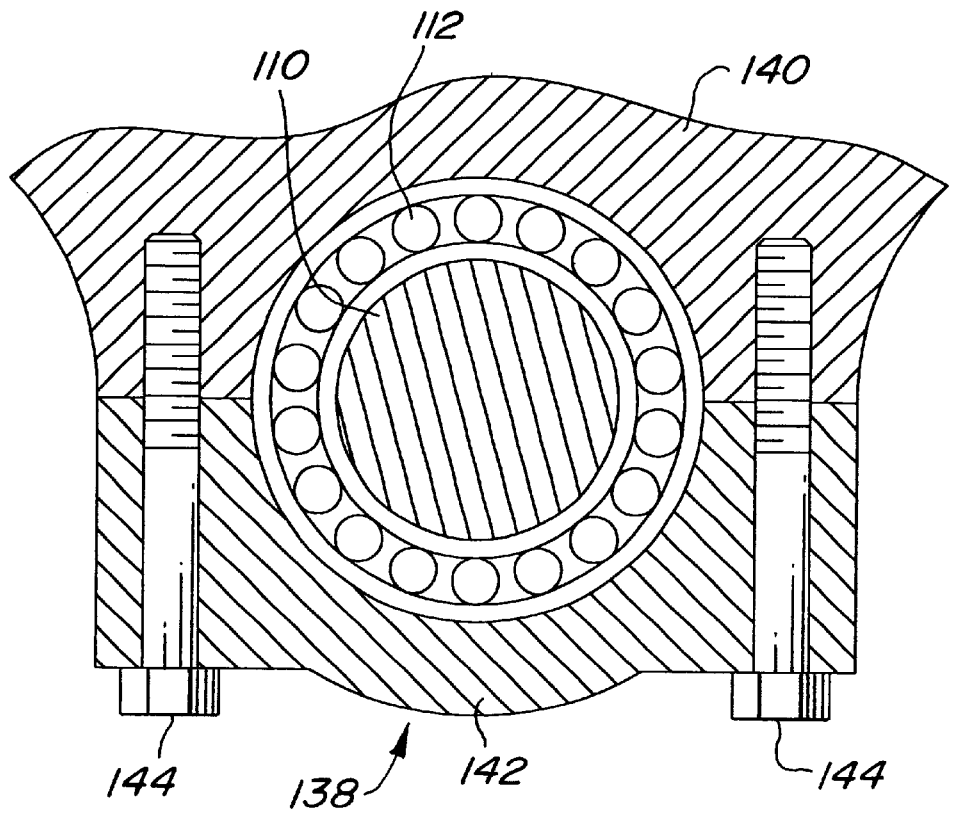
FIG. 6 is a side view of the bearing mounting structure used on the interior side of the access plate.

As illustrated in FIG. 6, the steering shaft 110 is secured to the interior side of the access plate 100 by a split collar 138. Half of the collar is formed by an integral portion 140 of the access plate 100, whereas a second portion 142 is bolted to the integral portion 140 by bolts 144 trapping the bearings 112 and steering shaft 110 therein.

Figure 7:
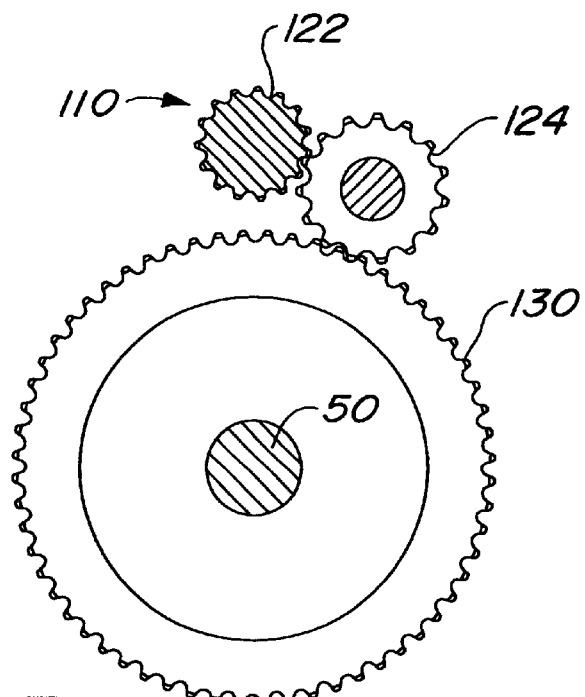
FIG. 7 is a side view of the arrangement of the reverser gear and the second spur gear.

The arrangement of the steering shaft 110, the reverser gear 124 and the second spur gear 130 is best illustrated in FIG. 7. The steering shaft 110, the pin 128 on which the reverser gear 124 is mounted and the axis of spur gear 130 are all parallel to one another. As discussed above, the diameter of the second toothed end 122 of the steering shaft 110 is smaller than the first toothed end 114. However, the gearing ratio applied to the first and second spur gears 116 and 130 is the same by correctly sizing the second toothed end and the reverser gear.

The access plate 30 has other features. A lubricating oil inlet 160 is formed in the access plate 30 and is coupled to an oil cooler for supplying cooling oil to the interior of the axle. The access plate 30 may also be provided with an oil fill opening and plug 162. Lubricating oil passages 164 may also be formed in the access plate 30. The access plate 30 may also be adapted to accommodate a valve 166 that equalizes the oil pressure in the axle caused by heating during operation of the work vehicle.

The invention should not be limited to the above described embodiments, but should be limited solely by the claims that follow.

We claim:

1. An axle for a differentially steered worked vehicle, the axle comprising:

an axle housing having an access opening;

a main drive input passing through the axle housing, a main rotational input is supplied into the axle housing by the main drive input;

first and second final drives for driving wheels, the wheels being rotatively mounted to the axle housing;

first and second planetary gear sets located in the axle housing, the first and second planetary gear sets directs the main rotational input from the main drive input to the first and second final drives;

an access plate for covering the access opening in the axle housing, the access plate having an exterior side and an interior side, the access plate further having a steering motor mount for receiving a steering motor, a steering shaft is rotatably mounted to the interior side of the access plate, the steering shaft being driven by the steering motor, a first spur gear drivingly engages the steering shaft and operatively engages the first planetary gear set, a reverser gear drivingly engages the steering shaft and operatively engages a second spur gear, the second spur gear operatively engages the second planetary gear set.

2. An axle as defined by claim 1 wherein the reverser gear is rotatively mounted to the interior side of the access plate.

3. An axle as defined by claim 2 wherein the steering motor mount is provided with a motor mount drive shaft that is rotatively mounted to the interior side of the access plate.

4. An axle as defined by claim 3 wherein the motor mount drive shaft is provided with a third spur pinion gear that engages a fourth spur gear mounted to the steering shaft.

5. An axle as defined by claim 4 wherein the steering motor mount is provided with a steering motor that drives the motor mount drive shaft.

6. An axle as defined by claim 5 wherein the steering motor is mounted to the exterior side of the access plate.

7. An axle as defined by claim 6 wherein the reverser gear is rotatably mounted on a pin mounted to the access plate.

8. An axle as defined by claim 6 wherein the first planetary gear set is provided with a first sun gear that is driven by the main drive input and which operatively engages a first set of planet gears mounted on a first planetary carrier, the first planetary carrier is operatively coupled to the first final drive for driving the first final drive, the first set of planets also are operatively coupled to a first ring gear that is operatively coupled to the first spur gear; and the second planetary gear set is provided with a second sun gear is driven by the main drive input and which operatively engages a second set of planet gears mounted on a second planetary carrier, the second planetary carrier is operatively coupled to the second final drive for driving the second final drive, the second set of planets also are operatively coupled to a second ring gear that is operatively coupled to the second spur gear.

9. A belt laying work vehicle comprising:

a main frame;

a track frame mounted to the main frame;

an axle coupled to the main frame, the axle having an axle housing, the axle housing having an access opening;

a pair of drive wheels mounted to the axle;

a pair of idler wheels rotatably mounted to the track frame;

a pair of inextensible elastomeric belts extending encompassing the drive wheels and the idlers;

a main drive input passing through the axle housing, a main rotational input is supplied into the axle housing by the main drive input;

first and second final drives for driving the drive wheels, the drive wheels being rotatively mounted to the axle housing;

first and second planetary gear sets located in the axle housing, the first and second planetary gear sets directs the main rotational input from the main drive input to the first and second final drives;

an access plate for covering the access opening in the axle housing, the access plate having an exterior side and an interior side, the access plate further having a steering motor mount for receiving a steering motor, a steering motor mounted to the steering motor mount, a steering shaft is rotatably mounted to the interior side of the access plate, the steering shaft being driven by the steering motor, a first spur gear drivingly engages the steering shaft and operatively engages the first planetary gear set, a reverser gear drivingly engages the steering shaft and operatively engages a second spur gear, the second spur gear operatively engages the second planetary gear set.

10. A belt laying work vehicle as defined by claim 9 wherein the reverser gear is rotatively mounted to the interior side of the access plate.

11. A belt laying work vehicle as defined by claim 10 wherein the steering motor mount is provided with a motor mount drive shaft that is rotatively mounted to the interior side of the access plate.

12. A belt laying work vehicle as defined by claim 11 wherein the motor mount drive shaft is provided with a third spur pinion gear that engages a fourth spur gear mounted to the steering shaft.

13. A belt laying work vehicle as defined by claim 12 wherein the steering motor is mounted to the exterior side of the access plate.

14. A belt laying work vehicle as defined by claim 13 wherein the reverser gear is rotatably mounted on a pin mounted to the access plate.

* * * * *